March 22, 1960     O. J. POUPITCH     2,929,181
MACHINE AND METHOD FOR ASSEMBLING CONTAINERS WITH A CARRIER
Filed May 20, 1957     7 Sheets-Sheet 1

INVENTOR.
Ougljesa Jules Poupitch
BY
Olson & Trexler
attys.

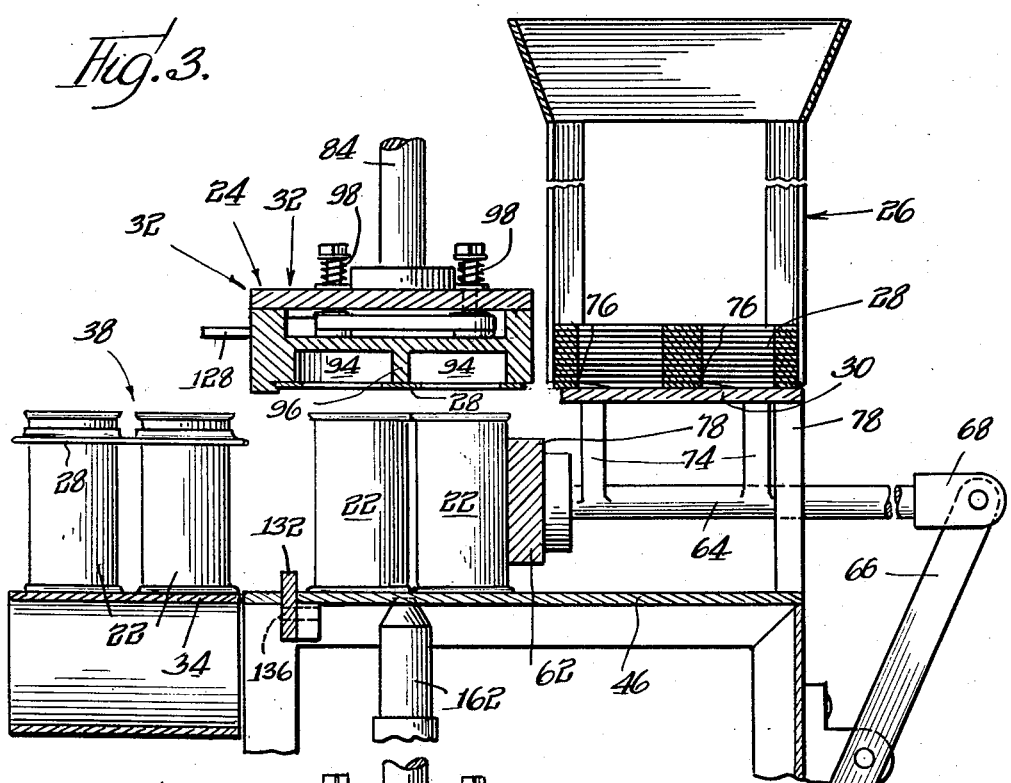
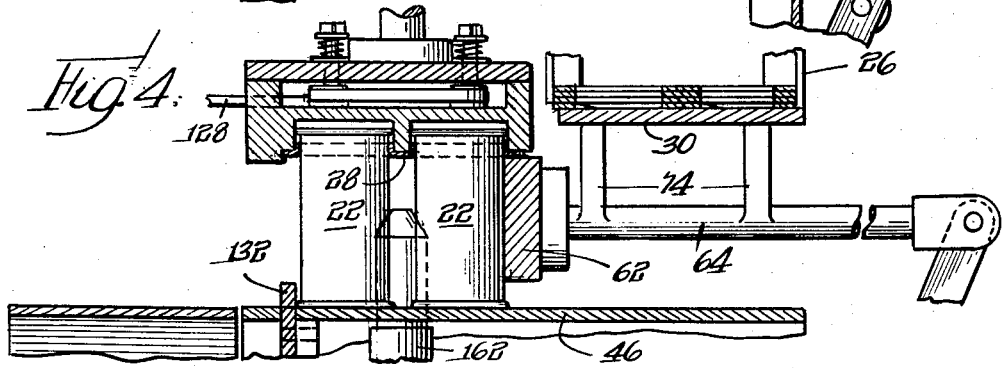
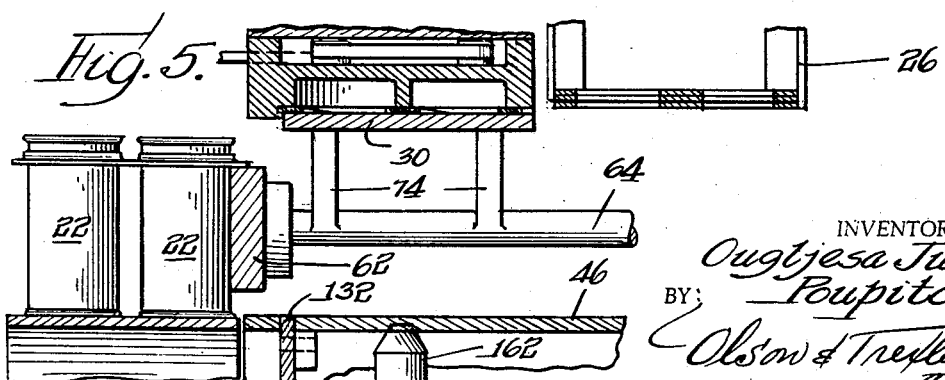

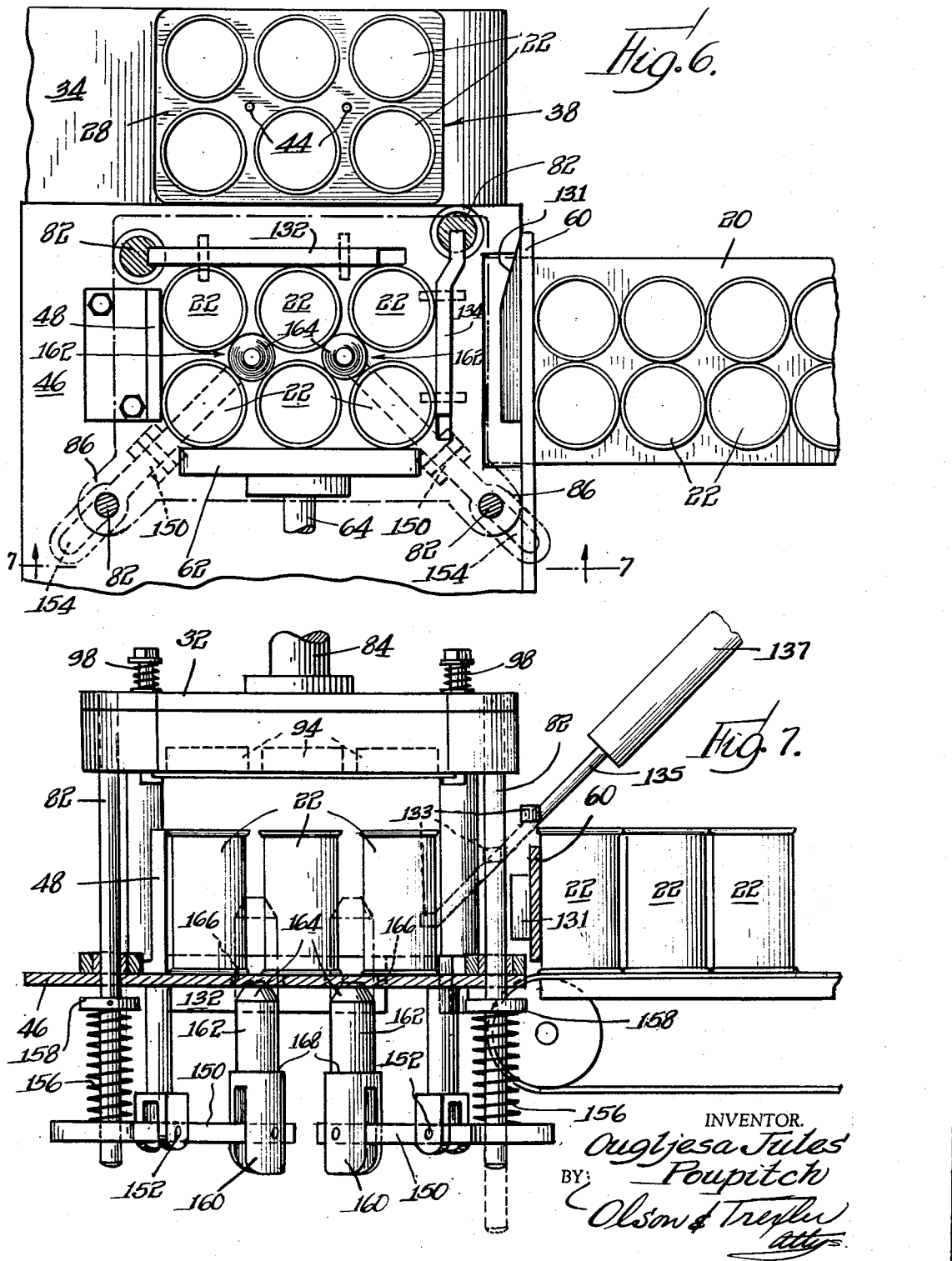

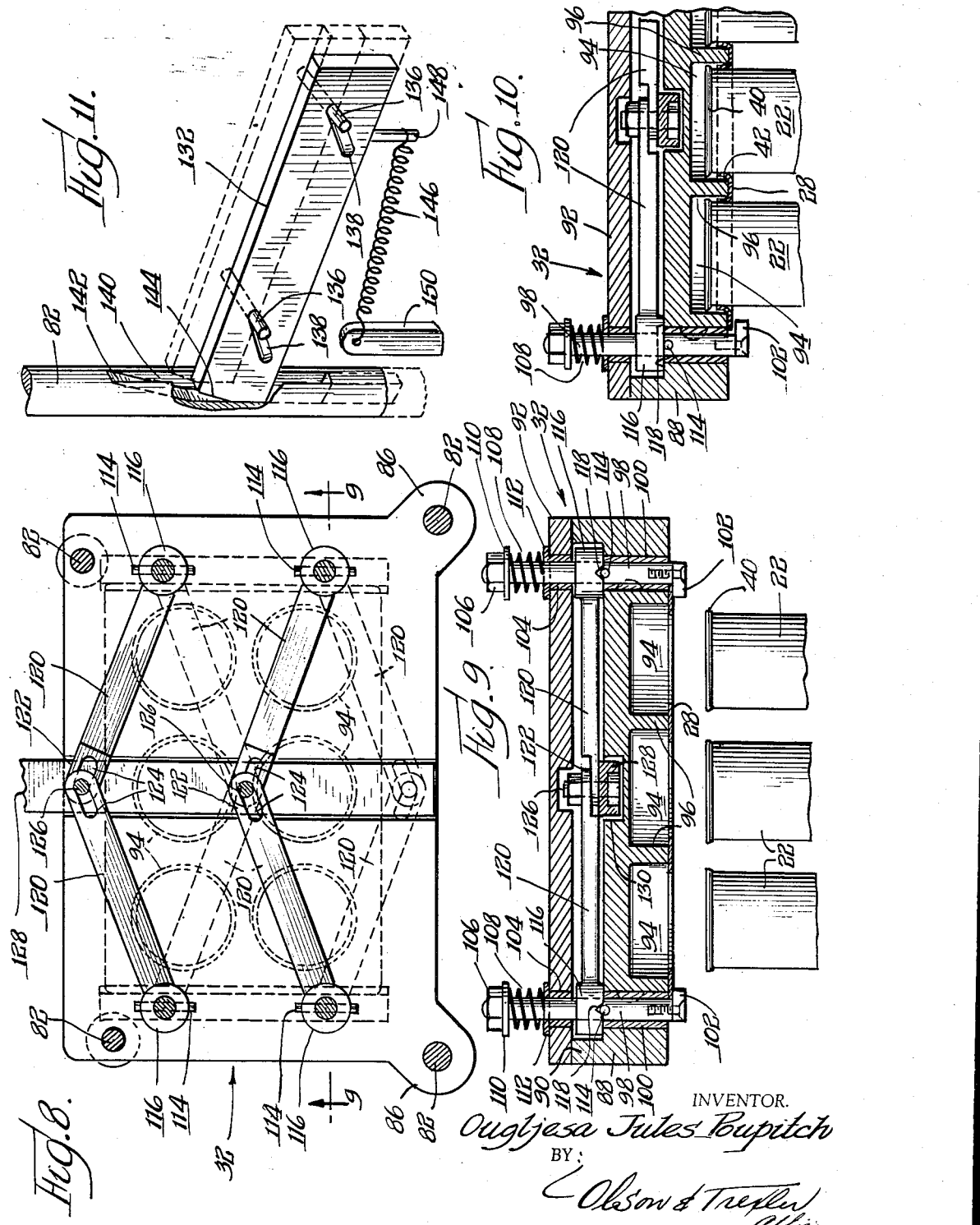

March 22, 1960     O. J. POUPITCH     2,929,181
MACHINE AND METHOD FOR ASSEMBLING CONTAINERS WITH A CARRIER
Filed May 20, 1957     7 Sheets-Sheet 6
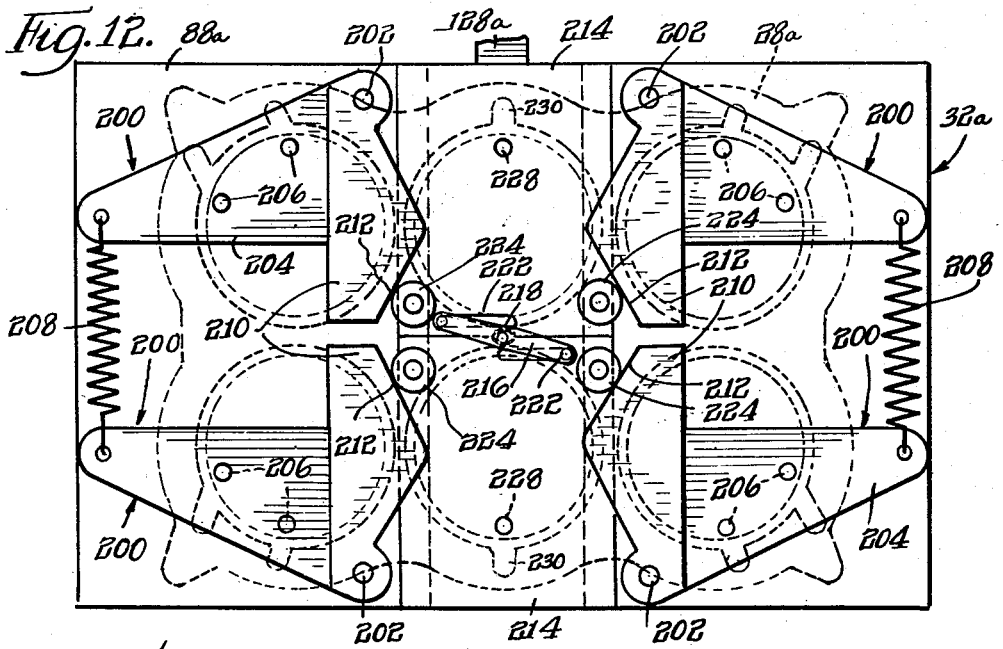
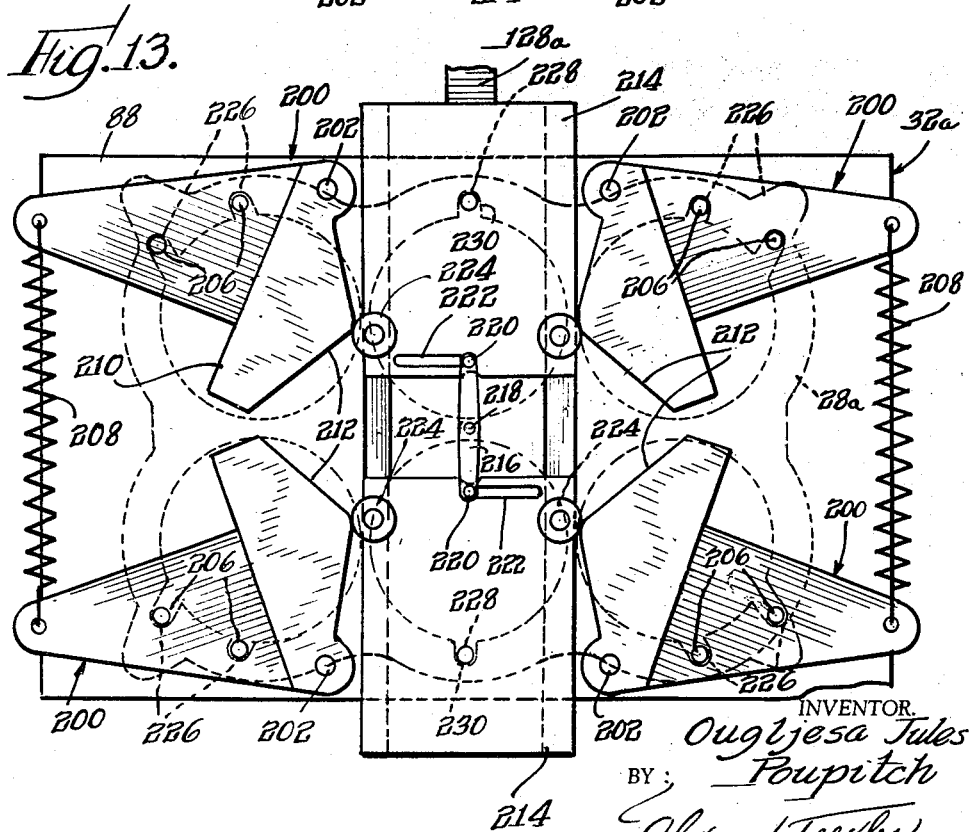
INVENTOR.
Ougljesa Jules Poupitch
BY Olson & Trexler
attys March 22, 1960     O. J. POUPITCH     2,929,181
MACHINE AND METHOD FOR ASSEMBLING CONTAINERS WITH A CARRIER
Filed May 20, 1957     7 Sheets-Sheet 7
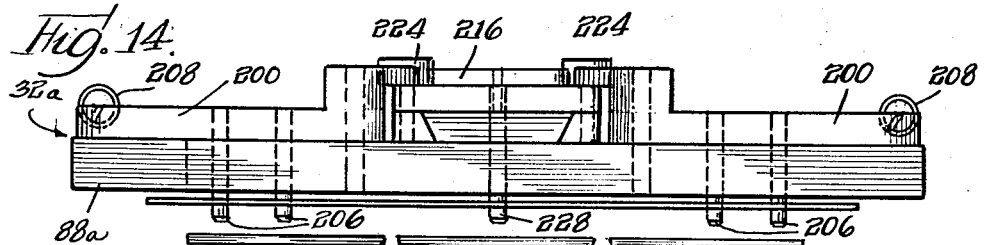
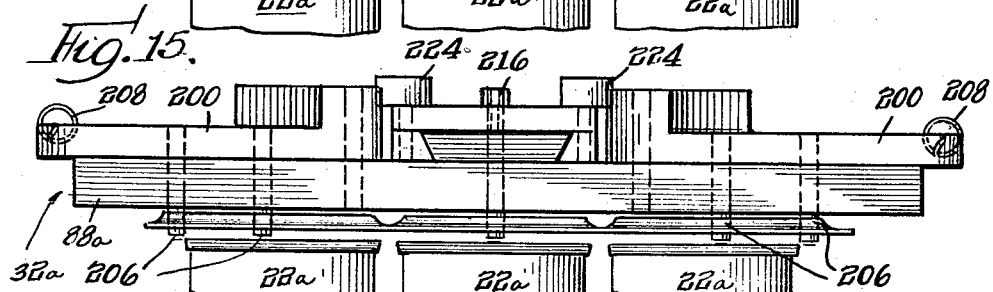
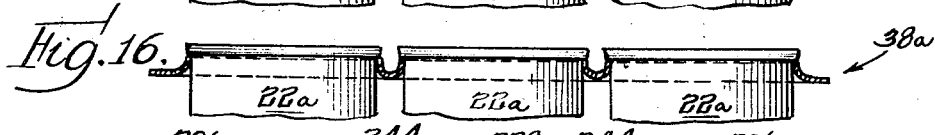
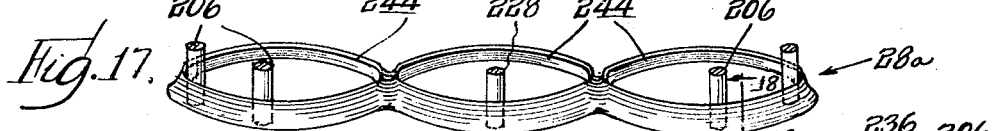
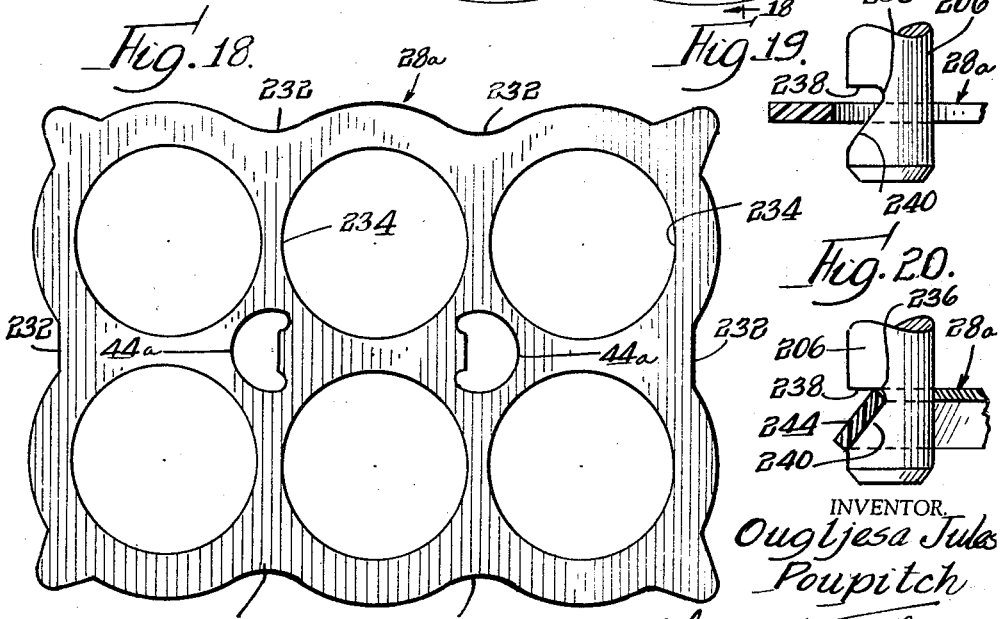
INVENTOR.
Ougljesa Jules Poupitch
By: Olson & Trexler Attys.

United States Patent Office 2,929,181
Patented Mar. 22, 1960

2,929,181

MACHINE AND METHOD FOR ASSEMBLING CONTAINERS WITH A CARRIER

Ougljesa Jules Poupitch, Itasca, Ill., assignor to Illinois Tool Works, Chicago, Ill., a corporation of Illinois Application May 20, 1957, Serial No. 660,176

14 Claims. (Cl. 53—35)

This invention is concerned generally with the art of container packaging, and more particularly with apparatus and methods for assembling a container with a plurality of cans.

As is well known, cans or other containers for beverages and foodstuffs frequently are assembled in packages for merchandizing. For example, beverage cans often are packaged or assembled in units or packages of six cans. Packages, receptacles, or retainers for such cans or other retainers obviously must hold the cans securely against separation. On the other hand, such packages or devices must allow ready separation or removal of the cans therefrom. Furthermore, the devices must be inexpensive, and must be readily assembled with the cans if they are to be commercially acceptable.

In my copending application, Serial No. 642,081, filed February 25, 1957, entitled "Can Carrier Device," there is set forth an improved container carrier or package formed of a sheet of plastic material and having apertures therein through which the cans are relatively inserted, the material adjacent the apertures being preformed, or stretched during installation into a substantially frusto-conical shape causing gripping of the cans below the beads thereof. This invention is concerned with apparatus and methods for assembling the carriers or plastic sheets with the cans.

It is an object of this invention to provide a machine and method for automatically assembling a plurality of cans with a carrier of the foregoing type.

It is a further object of this invention to provide a machine and method for assembling a sheet-like plastic carrier with a plurality of cans by stamping the carrier onto the cans.

It is another object of this invention to provide apparatus and methods for properly positioning cans for the stamping of a sheet material carrier thereunto.

Yet another object of this invention is to provide a machine and method for conveying a sheet-like plastic carrier from a magazine to position for assembling with a plurality of cans or the like.

Other and further objects and advantages of the present invention will be apparent from the following description when taken in connection with the accompanying drawings wherein:

Fig. 3 is a vertical cross section taken substantially along the line 3—3 of Fig. 2 with the parts in a given position of operation;

Fig. 4 is a fragmentary view generally similar to Fig. 3 and showing the parts in a different position of operation;

Fig. 5 is a similar fragmentary view showing the parts in still another position of operation;

Fig. 6 is a horizontal view partly in section as taken along the line 6—6 in Fig. 2;

Fig. 7 is a vertical view partly in section as taken along the line 7—7 in Fig. 6;

Fig. 8 is a plan view of the stamping or assembling head with the cover thereof removed;

Fig. 9 is a vertical section through the head as taken substantially along the line 9—9 of Fig. 8;

Fig. 10 is a view similar to Fig. 9 showing assembling of the carrier with the cans;

Fig. 11 is an enlarged perspective view showing the operation of a part of the mechanism as shown in Figs. 6 and 7;

Fig. 12 is a plan view similar to Fig. 8 showing a modified form of head;

Fig. 13 is a similar view with the parts in a different position of operation;

Fig. 14 is a side view of the head of Figs. 12 and 13;

Fig. 15 is a similar view showing the carrier or retainer as deformed by the head;

Fig. 16 is a fragmentary, vertical, longitudinal, sectional view showing the carrier as applied to the tops of the cans;

Fig. 17 is a perspective view showing the carrier as deformed by the head;

Fig. 18 is a plan view of a somewhat modified carrier as used with the head of Figs. 12 et seq.;

Fig. 19 is an enlarged detail sectional view as taken along the line 18—18 in Fig. 17 showing one of the carrier-engaging pins of the head; and Fig. 20 is a view similar to Fig. 19 showing the deformation of the carrier by the pins.

Figure 1:
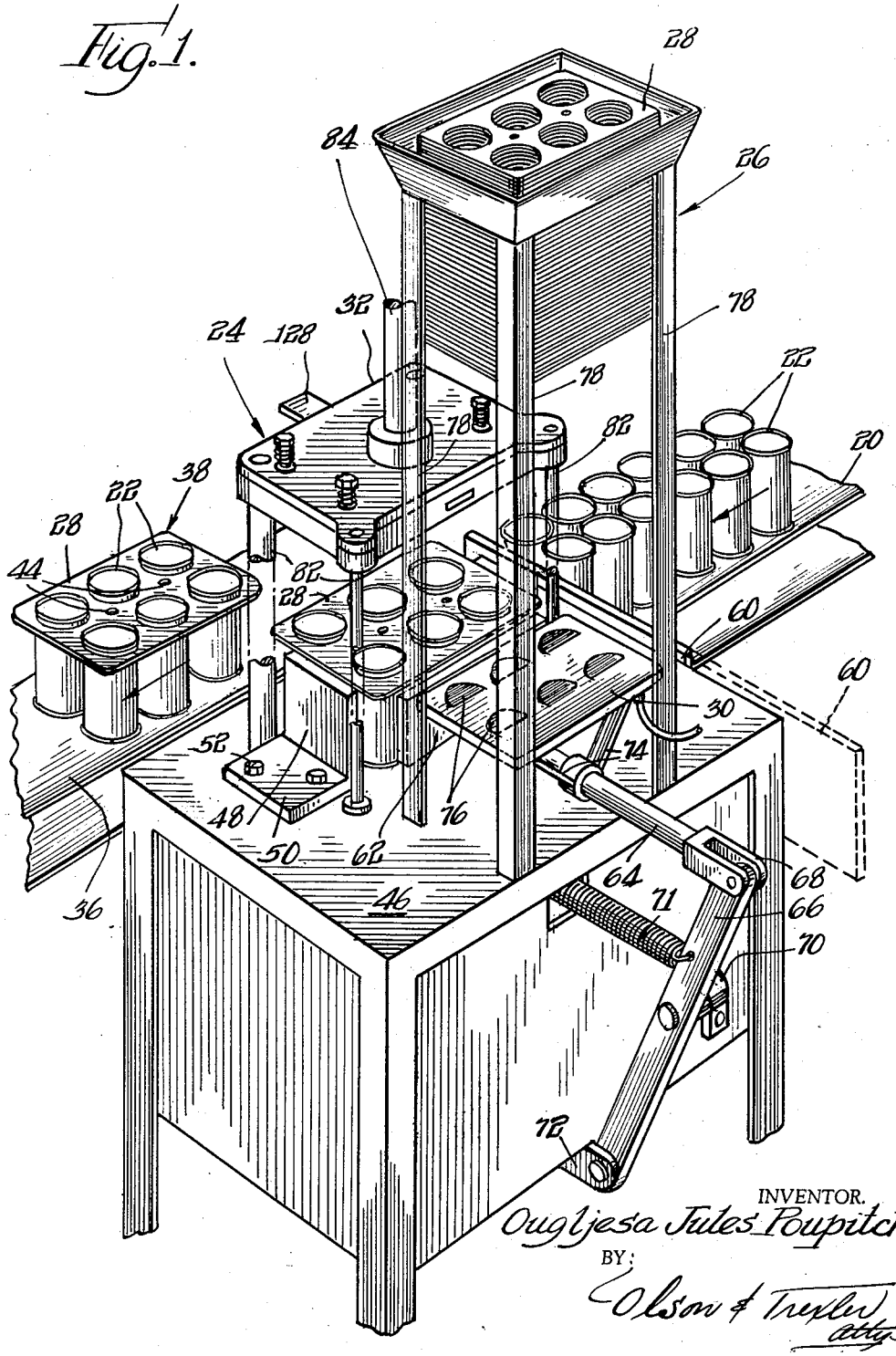
Fig. 1 is a perspective view of a machine exemplifying the invention.
Figure 2:
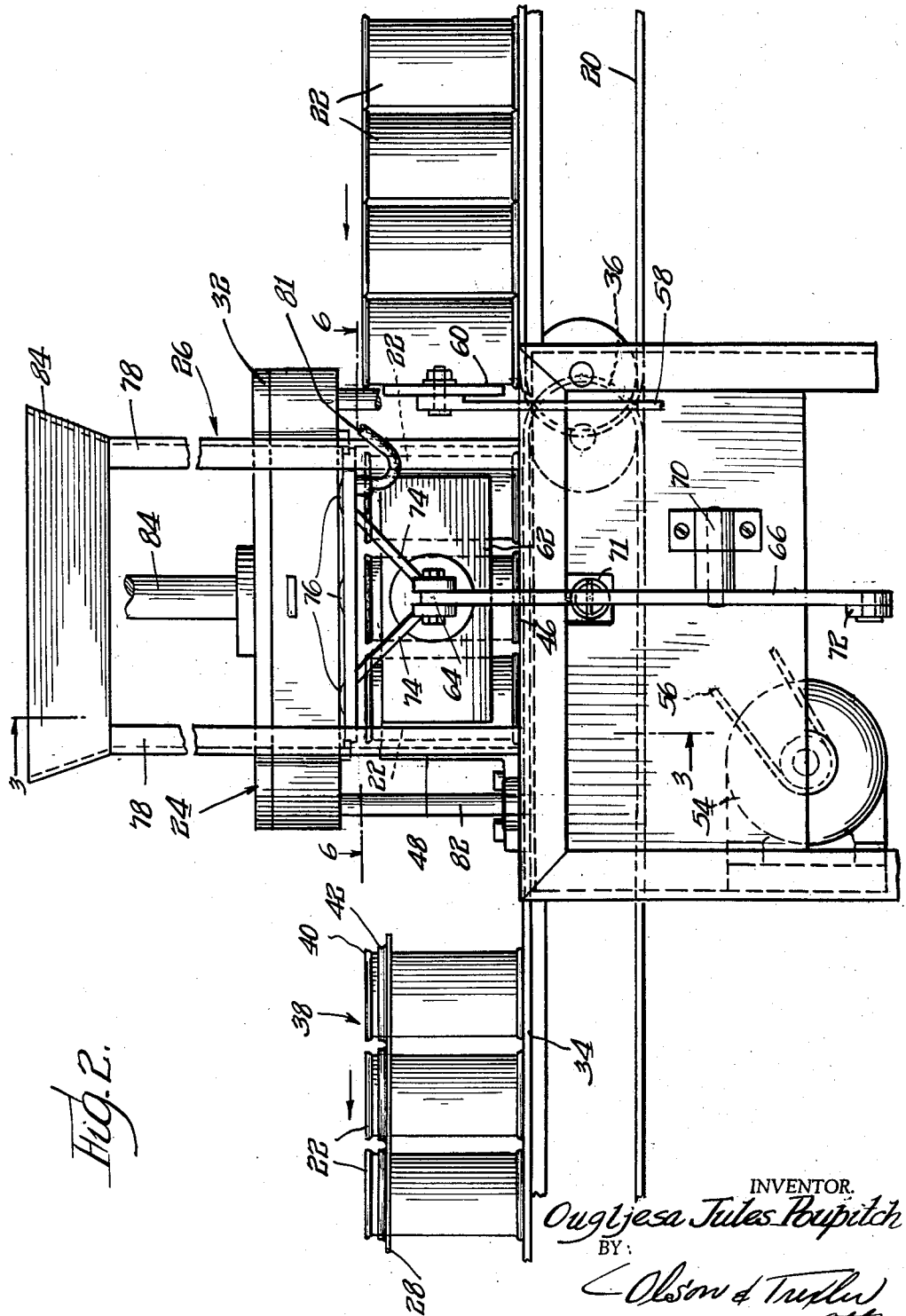
Fig. 2 is a side elevation thereof.

Referring now in greater particularity to the drawings and first to Figs. 1 and 2 for a general understanding of the machine and method, there will be seen an input or supply conveyor belt 20 on which a plurality or succession of cans 22 is supplied to an assembling station designated generally by the numeral 24. As will be understood, the conveyor belt 20 is of generally conventional construction, being supported by rollers. The cans are placed on the conveyor belt 20 by any known or suitable means, either by machinery or by hand.

At the assembling station 24 there is provided a magazine 26, the lower portion of which has been broken away or omitted to avoid obscuring the parts. The magazine holds a supply of plastic retainers 28 for assembling with groups of the cans 22. A transfer mechanism 30 is provided for shifting the retainers 28 one by one from the bottom of the stack to a head 32 which forces the plastic retainers 28 over the cans 22. The assembled units or packages then are displaced from the assembling station 24 onto a conveyor belt 34 for removal from the machine. As will be understood, this conveyor belt is supported in any suitable manner, such as by rollers 36, and may run continuously, although the other parts of the machine operate intermittently.

Before taking up the parts of the machine in greater detail, it is thought that reference to the completed unit or package would be helpful. Thus, referring to Figs. 1 and 2, the packages hereinafter identified by the numeral 38 comprise a plurality of cans 22, conveniently six in number, assembled with one of the plastic retainers 28. The retainers initially are flat sheets of plastic, such as polyethylene, and are provided with apertures which are smaller in diameter than the beads 40 at the ends of the cans. The apertures are also slightly smaller in diameter than are the cans. Accordingly, when a can is pushed upwardly through the retainer (or conversely, and equivalent thereto, when a retainer is pushed down over one or more cans) the material of the retainer is flexed upwardly about each can to form a frusto-conical section or pocket as at 42. Each section or pocket 42 elastically grips the associated can, and engages beneath the bead 40 thereon. The cans cannot readily be pulled back down through the retaining sections as this would require inversion of the retaining section, and the cans therefore are held quite tightly. However, the cans can be lifted upwardly, and cam rather readily through the retaining sections. The plastic sheets or retainers 28 are provided generally along the center line thereof with apertures 44 for receipt of a carrying handle, or these apertures can be large enough for insertion of a thumb and a finger for carrying the package.

The assembling station 24 includes a table 46, and cans 22 from the conveyor belt 20 are discharged on this table, coming to rest against an upstanding wall or stop 48 thereon. The wall 48 is provided with a horizontal flange 50 through which bolts 52 are passed to secure the wall to the table. The conveyor belt 20 is preferably driven intermittently by a motor 54 through a belt and pulley arrangement 56, and through an intermittent motion mechanism of any known or suitable type, such as a Geneva mechanism. This intermittent motion mechanism also is connected through suitable mechanism, such as a connecting rod 58, to reciprocate a gate 60 arresting cans 22 on the conveyor belt 20, whereby to segregate cans at the assembling station 24 on the table 46. As will be appreciated, in the illustrative example the cans 22 are supplied in a double row on the belt 20, and six such cans are arrested at the assembling station. The gate 60 comprises a vertical wall which reciprocates laterally of the path of movement of the cans, as will be apparent with reference to Fig. 1.

The right side of the assembling station, looking upstream as in Figs. 1 and 3, is defined by a ram or pusher plate 62 on the end of a reciprocable connecting rod 64, and the ram 62 is reciprocable transversely of the conveyor belts 20 and 34.

Support bearings for the connecting rod 64, or guides for the ram 62 may be provided in any expedient position, and form mechanical details which would serve to obscure the more important aspects of this invention. Hence, such bearings or guides have been omitted from the drawings. A lever 66 is pivotally connected to the outer end of the connecting rod 64 by means such as a clevis 68. The lever 66 is pivoted intermediate its ends at 70, and the spring 71 is tensioned between the upper arm of the lever 66 and the frame supporting the table 46. The lower end of the lever 66 is pivotally secured to a connecting rod 72, and this connecting rod is actuated through suitable mechanism such as a cam and cam follower, from the motor 54 whereby to effect reciprocation of the ram 62 in timed relation with the remaining parts of the machine.

The transfer mechanism, release, or carrier 30 associated with the magazine 26 is supported from the connecting rod 64 by means of V-shaped arms 74, and includes a generally rectangular metallic plate having struck-up pickups or partial rims 76 positioned in accordance with the left edges of the apertures in the plastic sheets or carriers 28. As may be seen in Fig. 3, the leading edges (the left side) of the pickups form substantially right angles with the transfer plate 30, whereas the trailing edges slope gently upwardly.

The magazine 26 is of the coin-changer type and comprises corner frame members 78 engaging the corners of a stack of the plastic sheets or retainers 28. The stack of retainers 28 is supported from beneath substantially along the opposite edges thereof, and the carrier or transfer mechanism or plate 30 reciprocates beneath the magazine. As the transfer plate 30 shifts to the right (Fig. 3), the pickups or rims 76 cam into the apertures in the bottom sheet or retainer 28. When the transfer device subsequently moves to the left, it carries the bottom sheet or retainer from the magazine into the head 32, sliding the retainer from the bottom of the stack. Vacuum holding means also is provided on the transfer device 30 and, to this end, a vacuum hose 81 leads from a vacuum source to the transfer device 30. The vacuum holds the retainer flat against the transfer device 30 as will be appreciated.

The head 32 is of generally rectangular configuration and is secured to the upper end of four vertical rods 82 which are slideable up and down in the table 46. The head also has affixed thereto a drive rod 84 extending vertically upwardly substantially from the center of the head. This drive rod effects vertical reciprocation of the head. The head is shown in its normal raised position in Figs. 2, 3 and 9, and has been broken away and lifted from this position in Fig. 1 to avoid obscuring other parts.

The construction of the head 32 is best seen in Figs. 3, 8 and 9. It will be observed that the receiving side of the head (the right side, when looking upstream as in Fig. 1) is provided with a pair of diagonally outwardly extending ears 86 receiving a pair of the slide rods 82 whereby this pair of rods is spaced apart a greater distance than is the other pair of rods 82. The head includes a frame 88 having an upwardly extending periphery 90 on which a cover 92 is secured. The underside of the head base 88 is provided with pockets or hollow spaces 94 for receiving the upper ends of the cans 22 and these pockets or hollow spaces are separated by ribs 96. As will be understood, these pockets or hollow spaces are circular in outline and are just slightly greater in diameter than the can beads.

The head is provided with four vertical shafts 98 journaled in suitable bushings 100 in the base and retaining lugs 102 are mounted thereon for movement beneath one of the plastic retainers 28. The shafts 98 are provided with upward extensions journaled in bearings 104 in the cover 92 and nuts 106 threaded on the upper ends of the shafts trap helical springs 108 between washers 110 and 112 respectively bearing against the nuts 106 and the cover 92. These springs hold the cover firmly against the base and tend to hold the shafts 98 in a raised position. In such raised position the lugs 102 grip the edges of a plastic retainer 28 and hold it in place as shown in Fig. 9.

The shafts 98 are secured against turning as by being splined, or by being provided with a suitable key, and are provided with transverse pins 114. Journals 116 encircle the shafts 98 directly above the pins 114, and each journal is provided with a diametral V-shaped recess, slot, or groove 118 in its lower surface. When the journals are so oriented that the pins 114 are aligned with the recesses 118, then the springs 108 hold the shafts in raised position and the lugs 102 grip the plastic sheet or retainer 28 as shown in Fig. 9. However, when the journals 116 are pivoted or rotated from the position shown, the pins 114 are cammed out of the recesses 118 and the shafts 98 and lugs 102 are forced down thereby releasing the retainer 28.

The means for rotating the journals 116 comprises pairs of arms 120. The cover has been removed from the head in Fig. 8 more clearly to show the arms, and it will be seen that these arms extend diagonally into overlapping relation at 122 and are provided with elongated slots 124 receiving pivot pins 126 which are mounted in a slide bar 128 received in a recess 130 in the upper face of the base 88. When the slide bar 128 is positioned to the left, again looking upstream (or toward the top in Fig. 8), the pairs of levers or arms 120 extend diagonally to the left and the journals are positioned as shown, with the pins 114 received in the recesses 118 and the lugs 102 resiliently gripping the plastic retainer. When the slide bar is shifted to the right, then the levers or arms 120 are moved to the position shown in dashed lines in Fig. 8, and the pins 114 are cammed out of the recesses 118 and the lugs 102 are depressed to release the plastic retainer. The slide bar 128 conveniently is actuated from the same cam mechanism as the link or connecting rod 72 and suitable linkage or mechanism (not shown) preferably extends over the side of the machine to avoid interference with the magazine on the right side.

Reference to Figs. 9 and 10 reveals the manner in which the head 32 applies the plastic sheets forming the retainers or carriers to the cans 22. The plastic sheet 28 is held against the bottom of the head by the lugs 102 as noted previously. The head is lowered by the connecting rod 84 by any suitable cam or intermittent motion mechanism driven from the motor 54 and this forces the plastic sheet 28 over the beads 40 of the cans, the material of the plastic sheet deflecting upwardly around the cans ot form the frusto-conical sections 42 which are stretched and which grip the cans below the beads thereof. As will be observed in Fig. 10, the undersurfaces of the head base 88, including the ribs 96, hold the plastic sheet 28 down as it is forced over the cans. After the plastic sheet or retainer or carrier has been assembled with the cans, the bar 128 is pushed to the right (or down in Fig. 8), thus pivoting the arms 120 and journals 116 to cam the pins 114 downwardly out of the recesses 118. The plastic sheet, retainer, or carrier thus is released by the lugs 102 as shown in Fig. 10 and when the head then rises it leaves the carrier or retainer behind it on the cans.

As will be apparent from the foregoing, the cans must be spaced apart slightly in order for the plastic sheet or carrier to fit over them. On the other hand, the cans as fed along the belt 20 are in contacting relation. Mechanism for effecting proper spacing of the cans for reception of the plastic sheet or carrier is shown in Figs. 3–7 and 11. More particularly, the cans 22 from the belt 20 are fed on to the table 46 against the stop 48 and also against the ram or plate 62. Retractable limit plates 132 and 134 are mounted so as normally to be flush with the top surface of the table 64, and the cans slide in over the top of the plate 134 and subsequently are removed over the top of the plate 132. Clearance space beyond the end roller of the belt 20 must be provided for the plate 134 and operating mechanism therefor, and the cans 22 from the belt 20 must be moved across this clearance space. Mechanism for accomplishing this is shown in Figs. 6 and 7, and includes a cam 131 on the back or downstream side of the gate 60 to space the cans from the gate. The mechanism also includes a pusher 133, preferably shaped to conform to the can walls. The pusher is mounted on the end of a rod 135, such as a piston rod operated by a piston in a hydraulic or pneumatic cylinder 137. The pusher 133 normally is positioned above the tops of the cans 22 on the belt 20, as shown in solid lines in Fig. 7. When it is advanced by means of the piston and cylinder 137, the pusher initially engages the cans immediately below the top beads thereof, and then slides down the sides of the cans through the dashed-line positions as the pusher advances obliquely while moving the cans against the stop 48. The pusher 133 promptly is retracted in order to permit subsequent spacing of the cans as hereinafter set forth.

As best may be seen in Fig. 11, the plates 132 and 134 are mounted by means of pins 136 passing through diagonal slots 138. The illustration in Fig. 11 is of the plate 132, but it will be understood that the principles are similar as to the plate 134. One of the adjacent rods 82 is provided with a key slot 140 therein having a cam surface 142, and the corresponding end of the plate 132 is provided with a cam-follower surface 144. A spring 146 is stretched between a pin 148 on the plate 132 and a fixed anchor 150 to hold the end of the plate in the key slot 140, whereby lowering of the rod 82 with the head 32 causes the cam surface 142 to engage the cam follower surface 144 and thus to shift the plate 132 outwardly away from the rod 82 against the force of the spring 146. Such outward movement also causes the plate 132 to rise. Thus, the two plates 132 and 134 are raised to determine the final position of the cans 22.

A pair of diagonally mounted levers 150 is pivotally mounted on pins 152 on fixed parts of the machine frame, and the tails of the levers are enlarged and provided with longitudinal slots 154 receiving the bottom ends of the rods 82 fixed in the projecting ears 86 of the head 32. Coil springs 156 encircle the lower ends of the rods and are compressed between stops 158 fixed thereon and the enlarged tails of the levers 150. The opposite ends of the levers are pivotally received in the bifurcated lower ends 160 of separator members 162. The separator members are generally cylindrical and are provided at their upper ends with frusto-conical sections 164. The separator members 162 normally are positioned below the top surface of the table 46, but are movable upwardly through apertures 166 in the table. The upper limit of movement is determined by shoulders 168 joining the main portions of the separator members 162 to the depending, bifurcated lower ends 160. Thus, when the head is lowered to apply a plastic carrier or retainer to the cans, the rods 82 act through the springs 156 to pivot the levers or arms 150 whereby to raise the separators 162. The frusto-conical tips 164 of the two separators enter among adjacent cans and force them apart to the position shown in Figs. 4, 6 and 7, the cans being limited in movement by the ram 62, by the stop 48, and by the plates 132 and 134.

A modified form of head 32a and a slightly modified plastic carrier or retainer 28a are shown in Figs. 12–20. The head 32a comprises a plate or frame 88a. Actuating mechanism for the can separators preferably is secured to this head, as to the head previously described, but is omitted for simplicity. The frame or plate has four levers 200 pivotally mounted in pairs thereon on pivot pins 202. The levers 200 are mounted in opposed pairs and each includes a body 204 having a pair of depending pins 206 thereon. Helical springs 208 are stretched between apertures in the outer ends of the bodies or long arms 204 whereby to urge the bodies of adjacent pairs of levers 200 toward one another. The levers 200 also include relatively short, confronting arms 210, the arms of adjacent pairs terminating in rather close spaced relation. The arms 210 are provided with oblique cam edges 212.

A pair of opposed slides 214 is oppositely movable in a slideway between end pairs of levers 200. A lever 216 is pivotally mounted at 218 intermediate the slides, and depending pins 220 on the ends of the lever are received in transverse slots 222 in the slides 214. Therefore, whenever the uppermost slide (as viewed in Figs. 12 and 13) is retracted by the connector 128a, the lever 216 is pivoted and moves the other slide 214 in the opposite direction.

The slides are provided with pairs of cam rollers 224 bearing against the cam surfaces 212 of the levers, and the springs 208 acting on the levers normally act through the levers to hold the slides in the inward position as in Fig. 12. When the slides are moved out, as in Fig. 13, the rollers 224 act on the cam surfaces 212 and pivot the levers to the position shown in Fig. 13. This moves the pins out into recesses 226 provided in the plate 88a for this purpose. Similarly, depending pins 228 on the slides 214 move out into recesses 230.

The plastic carrier or retainer 28a (see particularly Fig. 18) is similar to that heretofore shown and described, but is scalloped along the edges as at 232 to provide thinner sections of material of substantially uniform width between the various apertures 234. In addition, the handle apertures 44a are made sufficiently large and of proper shape to be readily grasped by the thumb and a finger whereby to carry the resulting package.

As will be seen in Figs. 19 and 20, the lower ends of the pins 206 (and also of the pins 228) are provided with notches 236 having horizontal upper edges 238 and inclined or oblique lower edges 240. With the parts in the position shown in Fig. 12 and also in Fig. 14, the head is lowered so that the pins 206 and 228 project into the apertures 234 of the plastic retainer 28a. The parts are then moved to the position shown in Fig. 13 and, in so doing, the pins pull outwardly on the material adjacent the apertures 234 thereby stretching the apertures or openings and deflecting them into a frusto-conical shape, as 244. The pins thus are positioned outwardly beyond the rims of the cans and the openings 234 are stretched somewhat from their initial size, which is slightly smaller than the can diameter, to a size which is substantially the same as the can diameter, thus allowing easy placement of the plastic retainer over the tops of the cans.

As will be understood, the head has a normal rest position slightly higher than the path of travel of the transfer mechanism. Accordingly, the transfer mechanism, which may be identical with that previously described, is capable of moving from the magazine into a position beneath the head in position for the head to receive one of the plastic retainers carried by the transfer mechanism. The head is then lowered somewhat in order for the pins 206 and 228 to project into the openings 234 of the retainer and the retainer is stretched, as described. The head then rises somewhat to remove the retainer from the transfer mechanism and to provide clearance whereby the transfer mechanism may move past the pins. After withdrawal of the transfer mechanism, the head again lowers in order to force the retainer 28a over the tops of the cans 22a to form the completed packages 38a. The head then rises and the pins are returned to their normal position. The cans are moved in and out of the assembling station in the same manner as heretofore described and the cans are assembled with the retainer in the same fashion, being readily withdrawn from the top of the retainer but resisting downward withdrawal.

From the foregoing, it is thought that the operation and structure of the machine and method will be understood. Cans 22 are fed in along the belt 20 up against the stop 48 at the assembling station 24, the six cans which are to have a retainer assembled therewith being separated from the remaining cans by the gate 60. Assuming that a plastic sheet, retainer, or carrier is already retained beneath the head 32, the head descends, thus raising the plates 132 and 134, the ram 62 being in its normal retracted position, and also raising the separators 162 whereby the cans are properly positioned so that the retainer carried by the head is stamped over the cans. The head then is raised with the result that the separators 162 and the plates 132 and 134 are retracted. The connecting rod 64 then is moved to the left whereby the ram is advanced to push the completed package 38 out onto the belt 34 for feeding away from the assembling station. At the same time as the ram advances, the transfer plate or carrier 30 moves across the bottom of the magazine 26 to carry another plastic sheet or retainer 28 into position beneath the head 32 where it is gripped for retention. Upon backward movement of the ram, the transfer device 30 also moves reversely, thereby being positioned beneath the magazine with the rims 76 camming into the next plastic sheet or retainer for transfer thereof from the magazine to the head 32. Subsequently, the gate 60 is retracted and six more cans are fed into the assembling station for a repetition of the action just described.

Various changes in structure and method will no doubt occur to those skilled in the art, and are to be understood as forming a part of the invention insofar as they fall within the spirit and scope of the appended claims.

Invention is claimed as follows:

1. The method of assembling a plurality of containers with a flat elastic carrier having a like plurality of apertures therein smaller than said containers which comprises feeding a succession of containers along a predetermined path in parallel array to an assembling station, segregating a predetermined number of said containers at said assembling station, supporting a carrier at said assembling station spaced from said predetermined number of containers axially thereof, relatively shifting said carrier and said predetermined number of containers toward each other axially of said containers and stretching the material of said carrier about said apertures while individually inserting the containers into the apertures whereby to associate said carrier telescopically with said predetermined number of containers to form a package unit, and thereafter shifting said package unit away from said assembling station.

2. Apparatus for assembling a plurality of containers with a carrier comprising means for feeding a succession of containers along a predetermined path to an assembling station, means at said assembling station for supporting a predetermined number of said containers parallel to one another, means at said assembling station for supporting a carrier spaced from said containers axially thereof, means for relatively moving said carrier supporting means and said predetermined number of containers toward one another axially to assemble said carrier with said predetermined number of containers, means for relatively moving said carrier supporting means axially away from said predetermined number of containers, and means for shifting the package unit so formed away from said assembling station.

3. Apparatus for assembling a plurality of containers with a carrier comprising means for feeding a succession of containers along a predetermined path to an assembling station, means at said assembling station for supporting a group of said containers parallel to one another, means at said assembling station for supporting a carrier spaced from said group of containers axially thereof, a magazine positioned adjacent said carrier supporting means and holding a plurality of sheet-like carriers, transfer mechanism for shifting carriers edgewise one by one from said magazine to said carrier supporting means, means for relatively moving said supporting means and said group of containers toward one another axially of said containers to associate said carrier therewith to form a package unit, means for relatively moving said carrier supporting means axially away from said group of containers, and means for shifting said package unit away from said assembling station.

4. Apparatus as set forth in claim 3 wherein the carrier comprises a sheet of material having a plurality of apertures therein, and wherein the transfer mechanism comprises a substantially flat plate having upward projections thereon fitting into at least some of the apertures in a carrier while said plate lies beneath said carrier, the projections being substantially at right angles to said plate on one side for urging said carrier edgewise, and having cam surfaces on the other side for camming under a carrier.

5. Apparatus as set forth in claim 3 wherein the transfer means and the package-unit-shifting means are interconnected and operate simultaneously.

6. Apparatus as set forth in claim 3 wherein the carrier supporting means includes clamp means, and further including means for releasing said clamp means as said carrier supporting means is moved away from said group of containers for releasing the carrier and for receiving another carrier.

7. Apparatus for assembling a plurality of containers with a carrier comprising means for feeding a succession of containers along a predetermined path to an assembling station, means at said assembling station for supporting a group of said containers parallel to one another and in contacting relation, separating means movable among said containers to spread the containers of said group apart, means for moving said separating means among said containers, means at said assembling station for supporting a carrier spaced from said group of containers axially thereof, means for relatively moving said carrier supporting means and said group of containers toward one another axially of said containers to associate said carrier with said group of containers, means for relatively moving said carrier supporting means axially away from said group of containers, and means for shifting the package-unit so formed away from said assembling station.

8. Apparatus for assembling a plurality of containers with a carrier comprising means for feeding a succession of containers along a predetermined path to an assembling station, means at said assembling station for supporting a group of said containers parallel to one another and in contacting relation, spreader means for effecting separation of said containers, a head positioned axially above said group of containers for supporting a carrier, means for moving said head downwardly toward said group of containers to move said carrier into assembled relation therewith, means linking said spreader means with said head for effecting spreading apart of said containers as said head starts to lower, means for raising said head away from said group of containers, and means for shifting the package unit so formed away from said assembling station.

9. Apparatus for assembling a plurality of containers with a carrier comprising means for feeding a succession of containers along a predetermined path to an assembling station, means at said assembling station for supporting a group of said containers parallel to one another in columns and rows with adjacent containers contacting one another, four walls providing limits for lateral movement of the containers of said group, at least two of said walls being retractable for permitting said containers to be fed into said assembling station and away from said assembling station over said walls, and erectable for limiting movement of the containers of said group away from one another, means for controlling the erection and retraction of said two walls, a plurality of members capable of projecting among said containers to effect separation of said containers, a head at said assembling station for supporting a carrier spaced from said group of containers axially thereof, means for moving said head toward said group of containers to assemble the carrier therewith, means for causing said members to project among said containers during lowering of said head to effect separating of the containers, means for moving said head away from said group of containers, and means for shifting the package unit so formed away from said assembling station.

10. Apparatus as set forth in claim 9 wherein two of the walls comprise a fixed stop and a ram, the means for shifting the package unit away from the assembling station including said ram.

11. Apparatus for assembling a plurality of containers with a carrier comprising means for feeding a succession of containers along a predetermined path to an assembling station, means at said assembling station for supporting a group of said containers parallel to one another, means at said assembling station for supporting a carrier spaced from said group of containers axially thereof, a magazine positioned adjacent said carrier supporting means and holding a plurality of sheet-like carriers, transfer mechanism for shifting carriers one by one from said magazine to said carrier supporting means, means for relatively moving said carrier supporting means and said group of containers toward one another axially of said containers to associate said carrier therewith to form a package unit, means for relatively moving said carrier supporting means axially away from said group of containers, and means for shifting said package unit away from said assembling station, said sheet-like carriers each comprising a sheet of material having a plurality of apertures therein, and the carrier supporting means having a plurality of depending pins adapted to extend into the apertures of a carrier, and means for moving said pins apart whereby to stretch said carrier.

12. Apparatus as set forth in claim 11 wherein each of said pins is provided with a recess engageable with the material of a carrier adjacent an aperture thereof, whereby to bend such material upwardly to facilitate assembling with a container.

13. The method of assembling a plurality of containers with a flat elastic carrier section having a plurality of container gripping edges formed from the material of the carrier section and forming enclosed areas smaller than said containers which comprises feeding a succession of containers along a predetermined path in parallel array to an assembling station, feeding a carrier section edgewise to said assembling station, at said assembling station relatively shifting said carrier section and said containers toward each other axially of said containers and stretching the material of said carrier section adjacent said edges to enlarge said enclosed areas while individually inserting the containers therein whereby to associate said carrier section telescopically with said containers, and shifting said telescoped containers and carrier section away from said assembling station.

14. The method of assembling a plurality of containers with a succession of flat elastic carrier sections each having a plurality of container gripping edges formed from the material of the carrier section and forming enclosed areas smaller than said containers which comprises feeding a succession of containers transversely of their axes along a predetermined path in parallel array to an assembling station, feeding a succession of carrier sections edgewise to said assembling station, relatively shifting said carrier sections and said containers successively toward each other axially of said containers and stretching the material of said carrier sections adjacent said edges to enlarge said enclosed areas while individually inserting the containers therein whereby to associate said carrier sections telescopically with said containers, and shifting said telescoped containers and carrier sections away from said assembling station.

References Cited in the file of this patent

UNITED STATES PATENTS

| | | |
|---|---|---|
| 2,350,560 | Kimball | June 6, 1944 |
| 2,729,374 | Haycock | Jan. 3, 1956 |
| 2,755,611 | McGihon | July 24, 1956 |
| 2,823,946 | Okulitch et al. | Feb. 18, 1958 |